United States Patent [19]

Saka

[11] 4,011,494
[45] Mar. 8, 1977

[54] INVERTER WITH SYMMETRY CORRECTION CIRCUITS

[75] Inventor: Mehmet Saka, Stevenage, England

[73] Assignee: International Computers Limited, London, England

[22] Filed: Sept. 4, 1975

[21] Appl. No.: 610,451

[30] Foreign Application Priority Data

Sept. 21, 1974 United Kingdom ............ 41200/74

[52] U.S. Cl. ..................................... 321/12; 321/2
[51] Int. Cl.² ...................................... H02M 3/335
[58] Field of Search ............ 321/2, 12, 16; 330/15; 307/265

[56] References Cited

UNITED STATES PATENTS

| | | | |
|---|---|---|---|
| 3,439,251 | 4/1969 | Schaefer | 321/2 |
| 3,657,631 | 4/1972 | Martens et al. | 321/2 |
| 3,859,583 | 1/1975 | Reed | 321/12 |
| 3,870,943 | 3/1975 | Weischedel | 321/2 |
| 3,873,903 | 3/1975 | Koetsch et al. | 321/2 |
| 3,913,000 | 10/1975 | Cardwell | 321/2 |

FOREIGN PATENTS OR APPLICATIONS 1,206,212  9/1970  United Kingdom ............ 321/2

Primary Examiner—William H. Beha, Jr.
Attorney, Agent, or Firm—Hane, Sullivan & Spiecens

[57] ABSTRACT

An inverter switching circuit, for example for a power supply, including semiconductors in push-pull configuration. To compensate for differences (basically in storage time) between the semiconductors in the two limbs the input pulse to each limb is of a reference duration plus the difference between the output and input pulses of the other limb. In a modification the input pulse for each limb is of the reference duration less the difference between its own output and input pulses.

8 Claims, 5 Drawing Figures

INVERTER WITH SYMMETRY CORRECTION CIRCUITS

BACKGROUND OF THE INVENTION

This invention relates to switching circuits, and in particular to circuits including a pair of switching elements each of which can be caused by an input pulse to conduct for an output pulse.

Problems can arise if, owing to differences between the switching elements, the output pulses for the two elements are unequal in duration. An example occurs when the switching elements are semiconductors connected in push-pull configuration and driving an output transformer, and the circuit is operated as the inverter stage of a power supply. In that case differences in the durations of the output pulses can drive the transformer into saturation, with increased and possibly destructive dissipation in one of the semiconductors.

An important factor influencing differences in conduction time in semiconductors is the storage time, which results from the presence of injected minority carriers in the base or gate region of the semiconductor at the time when the input current is cut off. One way of overcoming the problem is by carefully selecting the semiconductors as matched pairs, with equal storage times. However, such selection is time-consuming and often not completely satisfactory since the storage times of the semiconductors tend to drift by different amounts with age and temperature. It has also been proposed to control the duration of the input pulses by a feed-back loop which compares the output pulses from the two semiconductors and alters the ratio between the input pulses to the two semiconductors in such a way as to tend to make the output pulses the same.

SUMMARY OF THE INVENTION

This invention provides a switching circuit comprising a pair of switching elements and a drive circuit for applying input pulses to the switching elements, each switching element being caused by an input pulse applied to it to conduct for an output pulse, and the drive circuit controlling the duration of the input pulses applied to each switching element in response to the durations of the output and input pulses of the other switching element in such a manner as to make the duration of the input pulses applied to each switching element substantially equal to a reference duration common to both switching elements plus the difference between the duration of the output and input pulses of the other switching element.

In a modification of the invention the duration of the input pulses applied to each switching element is controlled in response to the durations of its own output and input pulses in such a manner as to make the duration of the input pulses applied to each switching element substantially equal to a reference duration common to both switching elements less the difference between the durations of its own output and input pulses.

BRIEF DESCRIPTION OF THE DRAWINGS

Two forms of apparatus constructed in accordance with the invention will now be described in greater detail by way of example with reference to the accompanying drawings, in which.

DESCRIPTION OF THE PREFERRED EMBODIMENTS

Figure 1:
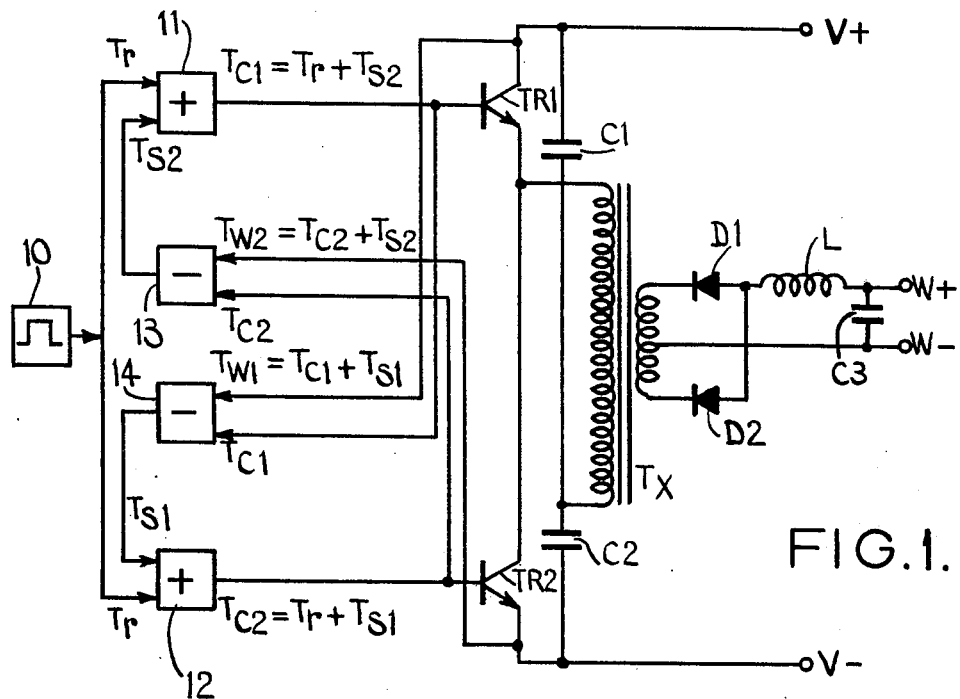
FIG. 1 is a simplified circuit diagram illustrating the principle of operation of the first form.

Referring to FIG. 1, the apparatus is a d.c. to d.c. converter, converting a d.c. voltage supplied to terminals V+ and V− to a d.c. voltage that is output at terminals W+ and W−. The circuit is in two main parts: an inverter stage converting the d.c. voltage to a train of a.c. pulses, and a rectifying and smoothing stage. Such circuits allow regulation of the output voltage by control of the pulse duty-cycle.

In the inverter stage two transistors TR1, TR2 are connected in push-pull configuration between the terminals V+ V−, a pair of capacitors C1, C2, and an output power transformer TX. In operation, input pulses are applied alternately to the transistors TR1, TR2 so as to cause them to conduct alternately (class B operation). This results in voltage pulses of alternate polarities across the primary of the transformer.

The output appearing at the secondary of the transformer is rectified and smoothed in the second stage by a circuit comprising two diodes D1, D2, a capacitor C3 and an inductor L to produce a d.c. output of the required magnitude.

The input pulses for the transistors are produced by an arrangement which, to help explain its principle of operation, will be regarded for the present as a pulse source producing a series a reference pulses of length $T_r$, directed alternately to two pulse-length adding circuits 11, 12. (It is to be understood that the term "length," when applied herein to pulses, is synonymous with "duration.")

The input to the base of transistor TR1 is a pulse of length $T_{c1}$. This causes the transistor TR1 to conduct, and to produce an output pulse of length $T_{w1} = T_{c1} + T_{s1}$ where $T_{s1}$ is the difference between the input and output pulses (basically the storage time). The sensing of the output pulses is shown diagrammatically only in FIG. 1. The input and output pulses of the transistor TR1 are both applied to the subtracting circuit 14, which produces a pulse of length equal to the difference in lengths of these two pulses i.e.

$$T_{w1} - T_{c1} = T_{s1}$$

The output pulse from the circuit 14 is stored in the adding circuit 12, and then added to the next reference pulse. The circuit 12 thus produces a pulse of length $T_{c2} = T_r + T_{s1}$, and this pulse is applied as input to the base of transistor TR2, causing it to conduct.

The difference between the output and input pulses of the transistor TR2 is measured by the subtraction circuit 13, in the same way that $T_{s1}$ was measured, and the output pulse from the circuit 13 is stored in the adding circuit 11 and then added to the next reference pulse. The circuit 11 thus produces a pulse of length $T_{c1} = T_r + T_{s2}$ which is applied as input to the transistor TR1.

It can be seen that the conduction times of the two transistors are given by:

$$T_{w1} = T_{c1} + T_{s1} = T_r + T_{s2} + T_{s1}$$

$$T_{w2} = T_{c2} + T_{s2} = T_r + T_{s1} + T_{s2}$$

and are therefore effectively identical despite any variations in $T_{s1}$ and $T_{s2}$.

The first form will now be described in more detail.

Figure 2:
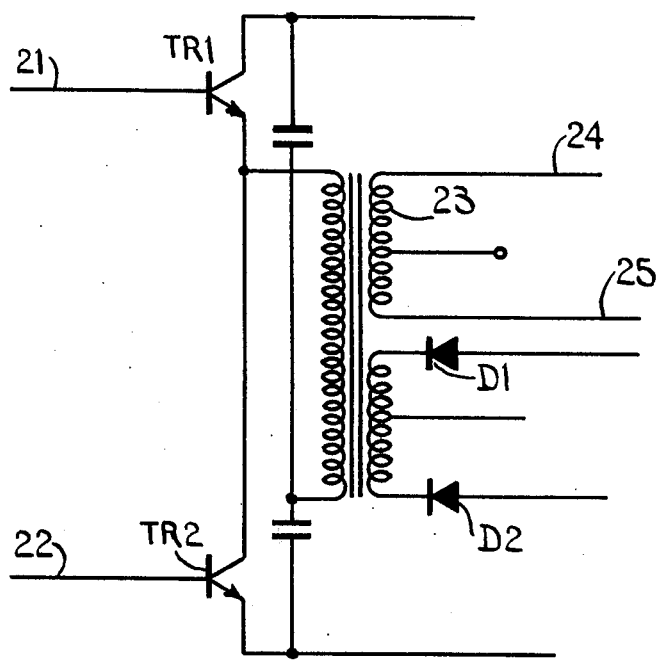
FIG. 2 shows the semiconductors and sensing circuit of the first form.

Referring to FIG. 2, the input pulses are delivered to the transistors TR1 and TR2 along lines 21 and 22 through base drive circuits (not shown). The output pulses are taken from an extra winding 23 on the output transformer Tx, which produces voltages suitable for inputting to transistor logic. The winding 23 is centre-tapped and outputs opposite-polarity waveforms on line 24 and 25.

Figure 3:
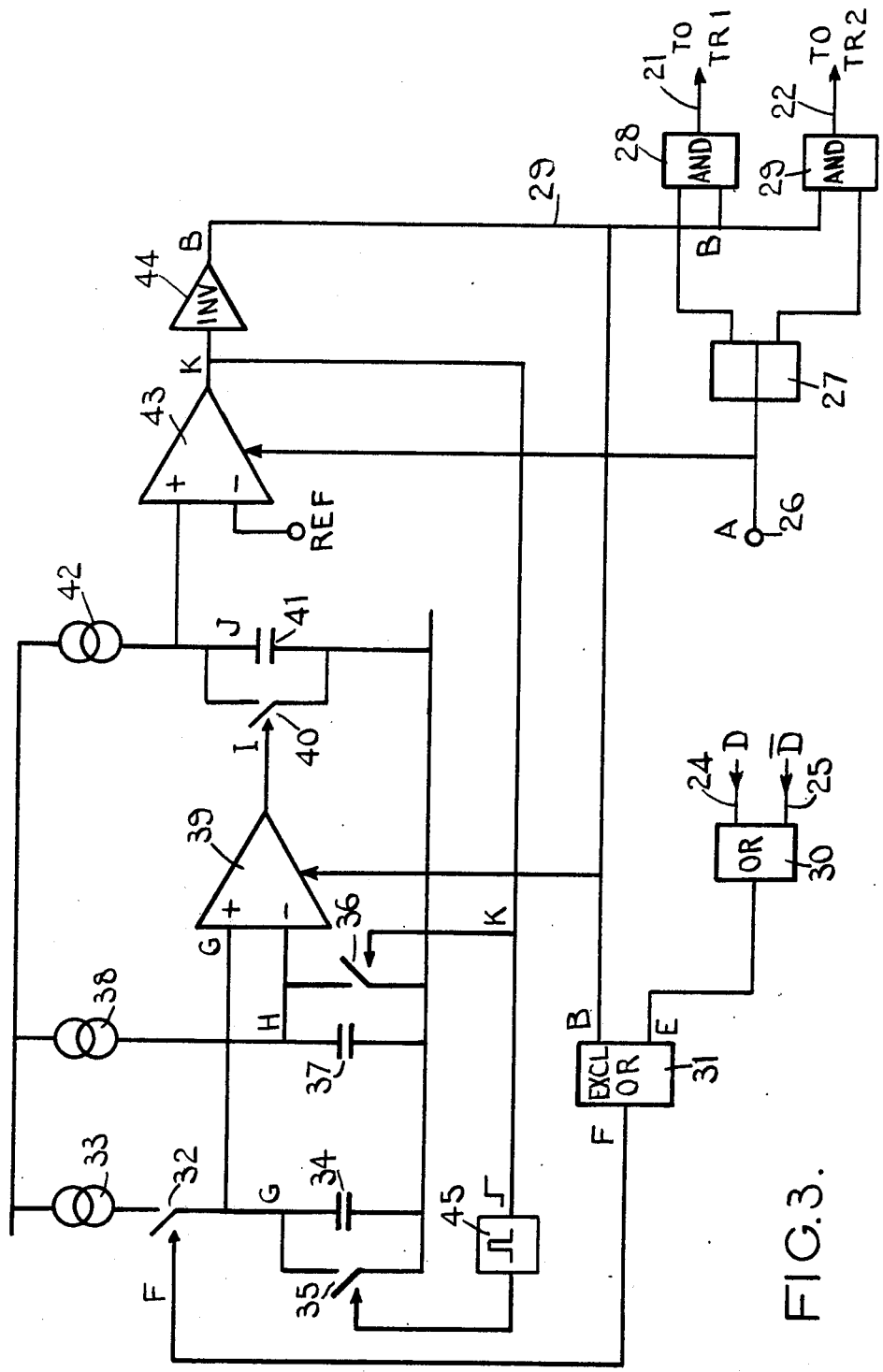
FIG. 3 is a circuit diagram of the drive circuit of the first form.
Figure 4:
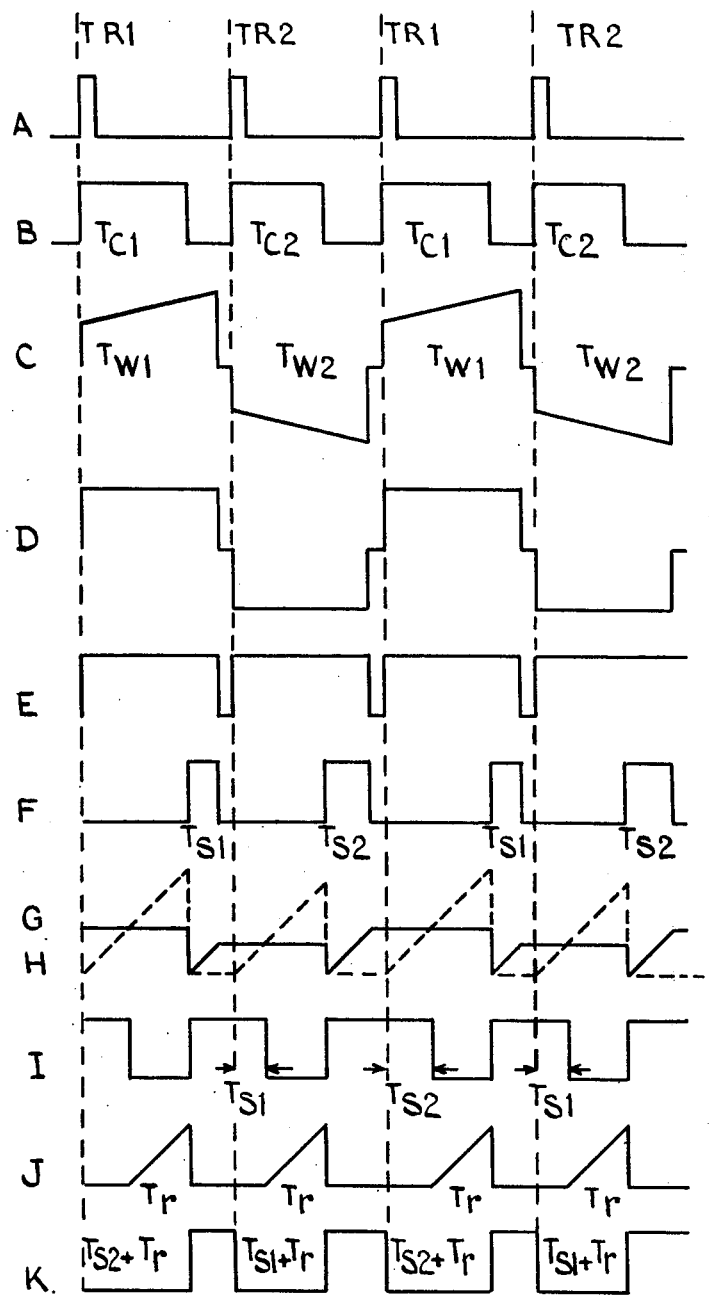
FIG. 4 shows diagrammatically the waveforms at the points of FIG. 3 marked with the corresponding letter.

Referring to FIG. 3, in the actual drive circuit the functions of the two subtracting circuits are carried out by the same equipment, as are the functions of the two adding circuits 13 and 14 (although this combination is of course not essential). And instead of a source of pulses of a reference duration, a train A of fixedlength clock pulses (see also FIG. 4) is supplied to a terminal 26 and the reference duration is derived electronically.

The clock pulses A trigger a bistable 27 which enables two AND gates 28 and 29 in turn. They direct the output waveform B of the drive circuit, consisting alternately of pulses of duration $T_{c1}$ and $T_{c2}$ each starting at the start of a clock pulse, to the two transistors TR1 and TR2 alternately The transistors conducts for pulses of length $T_{w1}$ or $T_{w2}$ each having a ramp top formed as the primary current increases against the impedance of the load (waveforms C.) The result induced in the sense winding 23 is a waveform D on the line 24 and its inverse D̄ on the line 25. The positive-going pulses of these two waveforms are added by an OR-gate 30 to give a waveform E.

An EXCLUSIVE-OR gate 31, which produces an output only when it receives a single input, subtracts the input waveform B from this waveform E and outputs pulses F of length $T_{s1}$ and $t_{s2}$. An output from the gate 31 closes a normally-open switch 32, allowing a constant-current source 33 to charge (waveform G, solid) a capacitor 34, which will just have been discharged by a switch 35 being closed momentarily. The final voltage across the capacitor 34 is thus proportional to the length of the pulse from the gate 31.

At the start of each half-cycle a switch 36 is opened allowing a capacitor 37 to be charged from a constant-current source 38 (waveform H, dotted). The voltages across the capacitors 34 and 37 are applied to the positive and negative inputs of a comparator 39; when the voltage across the capacitor 37 equals that across the capacitor 34 the output of the comparator 39 (waveform I) switches from high to low.

The capacitor 37 charges at the same rate as the capacitor 34. Therefore, the time from the start of the half-cycle to the point at which the comparator 39 switches is equal to the length of the pulses from the gate 31, that is, $T_{s1}$ or $T_{s2}$. This part of the circuit has thus stored a representation of the pulse from the gate 31 and reproduced the pulse starting at the beginning of the next half-cycle. When the comparator 39 switches to low, a switch 40 opens, allowing a capacitor 41 to be charged from a constant current source 42 (waveform J). (The three constant current sources 33, 38, and 42 are provided, in known manner, by transistors with constant base voltages provided by Zener diodes and are formed as a single network. The three switches 32, 37, and 40 are transistor switching elements in a single, commercially supplied package.)

The voltage across the capacitor 41 is compared to a reference voltage by a comparator 43, which switches its output (waveform K) when the reference voltage is equalled. The time that takes to happen depends on the value of the reference voltage and is equivalent to the reference pulse length in the simplified description with reference to FIG. 1. The total time from the start of the half-cycle to the change of state of the comparator 43 is thus $T_{s1} + T_r$ during a half-cycle supplying an input pulse to the transistor TR2 and $T_{s1} + T_r$ during half-cycle supplying an input pulse to the transistor TR2.

The waveform K is inverted by an inverted 44 to become the waveform B which is split to form the actual input pulses for the transistors.

The comparator 43 is connected to remain high until inhibited by a control signal formed by the start of any of the clock pulses, when the waveform K again becomes low. While it is low the switch 36 is held open, thus starting the charging of the capacitor 37 at the beginning of a half-cycle. The leading edge of the waveform K is also converted by a pulse-forming circuit 45 into a momentary pulse which, as mentioned, closes the switch 35 to discharge the capacitor 34.

Figure 5:
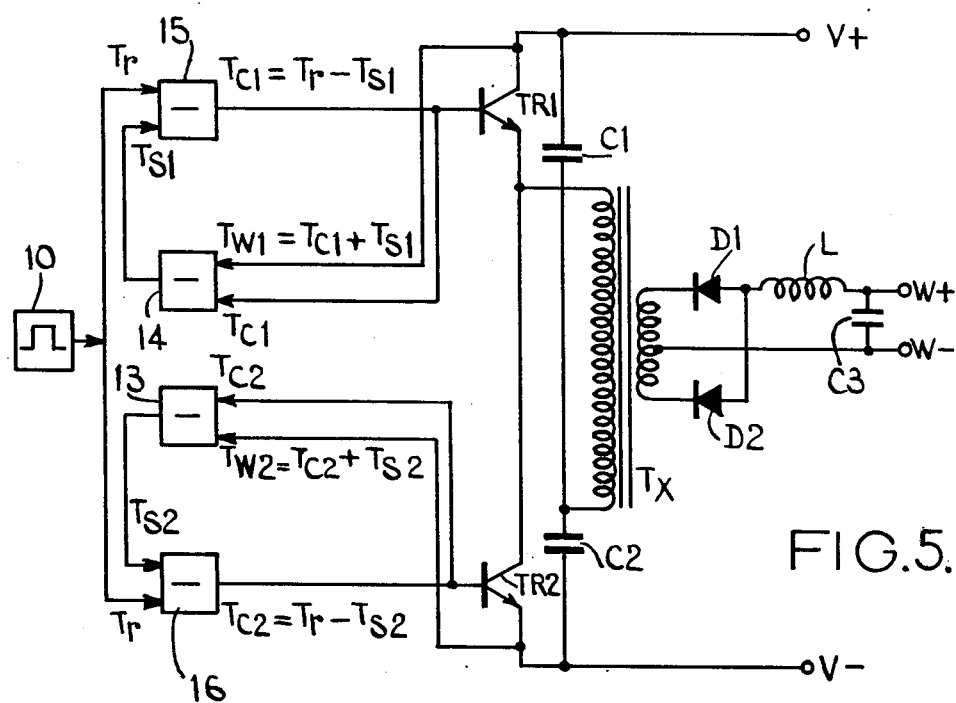
FIG. 5 is a simplified circuit diagram of the second form.

Referring to FIG. 5, in the second form of apparatus, after the input pulse for the transistor TR1 has been subtracted from its input pulse by the circuit 4, the difference between them is subtracted from the reference pulse by a circuit 15 to give the input pulse for that same transistor TR1, rather than added to give the input pulse for the other transistor. And for the transistor TR2 the output of the subtraction circuit 13 is subtracted from the reference pulse by a circuit 16 to give its input pulses.

The output pulse from the transistor TR1 is therefore given by $$T_{w1} = T_{c1} + T_{s1} = T_r - T_{s1} + T_{s1} = T_r$$

and the output pulse from the transistor TR2 by $$T_{w2} = T_{c2} + T_{s2} = T_r - T_{s2} + T_{s2} = T_r$$

Thus the two output pulses are again effectively equal.

In the actual circuit there are two separate channels for the two transistors because the difference durations need to be stored for a full cycle, that is, while the input pulse for the other transistor is being generated in the intervening half-cycle. Each channel corresponds generally to the appropriate part of FIG. 3, except that, for each, the voltage across a capacitor corresponding to the capacitor 34 and holding the pulse-difference, is subtracted from the reference voltage by an analogue subtractor, the result forming the negative input to the comparator corresponding to the comparator 43. And a capacitor corresponding to the capacitor 41 starts to charge at the start of the cycle. It then reaches the voltage of the other input after the reference duration less the pulse difference.

In both these forms of apparatus the single transistor of each limb of the inverter circuit can be replaced by a network of more than one transistor. In this network each transistor is connected to the next by a transformer in its emitter path in such a way that the currents through all the transistors of the network are forced to remain balanced. This allows the power rating of the circuit to be increased without the danger that, owing to differences between the parameters of different transistors, one draws more than its calculated share of current and fails. With this arrangement the difference between the output and input pulses will not be determined by the parameters of any particular transistor.

The output of the circuits can be varied by altering the reference voltage, which effectively modulates the reference pulse-width. The reference voltage can for example by an error voltage from a regulator circuit comparing the actual output W+, W− of the converter with a desired value.

The output pulses in these forms of circuit are equalised in at most a few half-cycles. This may be compared with an analogue circuit which attempts to equalise the pulses by a feed-back circuit responsive to the difference between them, which typically takes some 50 to 100 cycles to equalise the output pulses.

I claim:
1. An inverter switching circuit comprising:
   a. output transformer means;
   b. first and second switching means connected in push-pull configuration to said output transformer means each switching means being switchable, in response to an input pulse, from a non-conducting state to a conducting state for the duration of an output pulse;
   c. means for sensing the difference between the durations of the input and output pulses for each switching means;
   d. means responsive to the sensing means, for generating first and second trains of pulses, the pulses of the first train being timed to occur between the pulses of the second train, the pulses of the first train having a duration equal to a reference duration plus the difference between the durations of the input and output pulses for the second switching means, and the pulses of the second train having a duration equal to said reference duration plus the difference between the durations of the input and output pulses for the first switching means; and
   e. means for applying said first and second trains of pulses as input pulses to the first and second switching means respectively.

2. A circuit as claimed in claim 1 wherein said sensing means includes means for subtracting the input pulse from the output pulse for each switching circuit, to produce a pulse of duration equal to the difference between the durations of the input and output pulses for that circuit.

3. A circuit as claimed in claim 1, including means for varying the said reference duration.

4. A circuit as claimed in claim 1, in which the said switching elements comprise at least one semiconductor.

5. An inverter switching circuit comprising:
   a. output transformer means;
   b. first and second switching means connected in push-pull configuration to said output transformer means, each switching means being switchable, in response to an input pulse, from a non-conducting state to a conducting state for the duration of an output pulse;
   c. means for sensing the difference between the durations of the input and output pulses for each switching means;
   d. means responsive to the sensing means, for generating first and second trains of pulses, the pulses of the first train being timed to occur between the pulses of the second train, the pulses of the first train having a duration equal to a reference duration minus the difference between the durations of the input and output pulses for the first switching means, and the pulses of the second train having a duration equal to said reference duration minus the difference between the durations of the input and output pulses for the second switching means; and
   e. means for applying said first and second trains of pulses as input pulses to the first and second switching means respectively.

6. A circuit as claimed in claim 5 wherein said sensing means includes means for subtracting the input pulse from the output pulse for each switching circuit, to produce a pulse of duration equal to the difference between the durations of the input and output pulses for that circuit.

7. A circuit as claimed in claim 5 including means for varying the said reference duration.

8. A circuit as claimed in claim 5, in which the said switching elements comprise at least one semiconductor.

* * * * *